June 16, 1931. W. M. CROSS 1,810,696
PROCESS FOR THE HEAT TREATMENT OF STEEL
Filed April 8, 1929
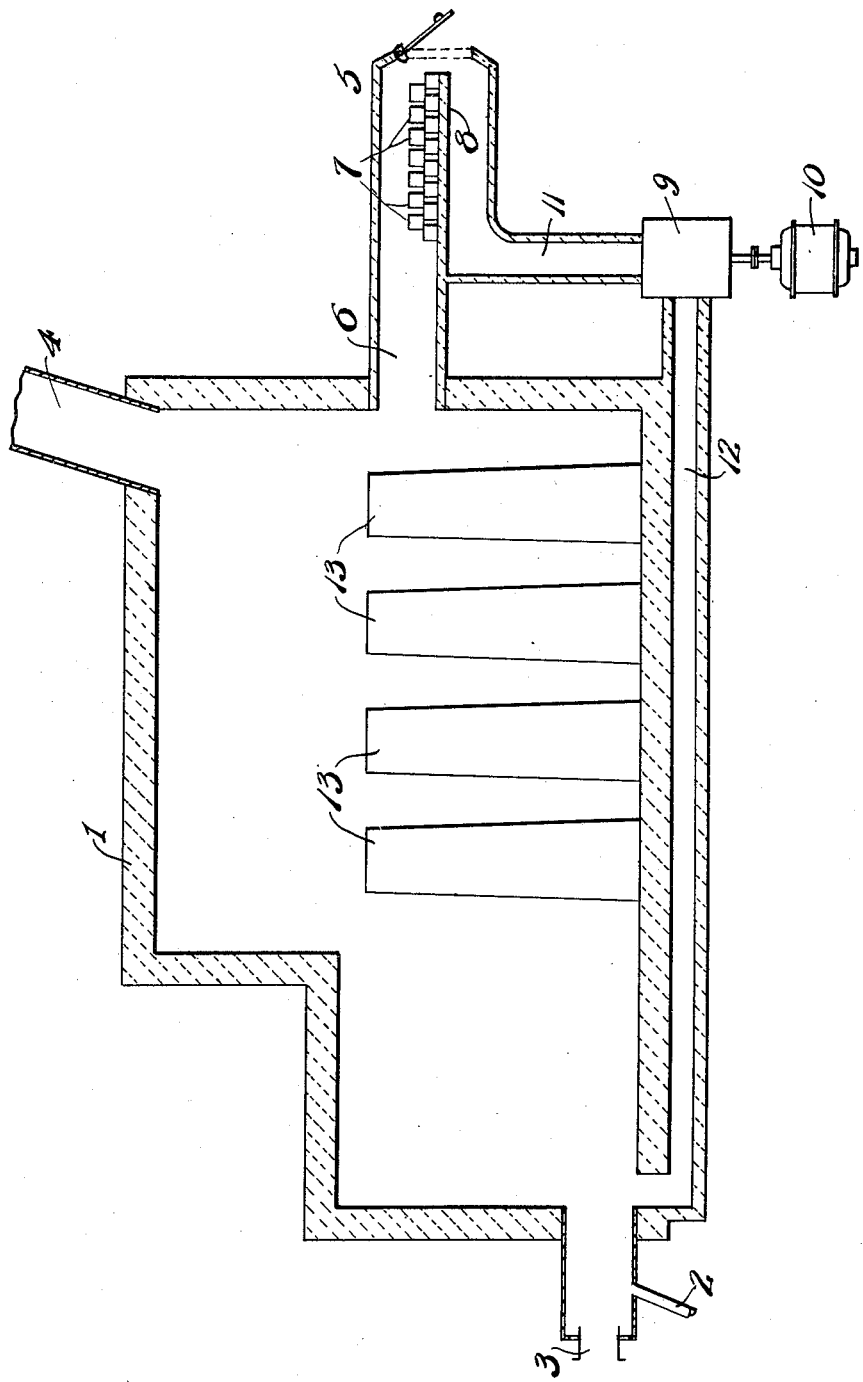
INVENTOR
Walter M. Cross
BY
Thomas E. Scofield
ATTORNEY Patented June 16, 1931

1,810,696

UNITED STATES PATENT OFFICE

WALTER M. CROSS, OF KANSAS CITY, MISSOURI, ASSIGNOR, BY MESNE ASSIGNMENTS, TO LORD SOUTHBOROUGH, OF LONDON, ENGLAND

PROCESS FOR THE HEAT TREATMENT OF STEEL

Application filed April 8, 1929. Serial No. 353,577.

This invention relates to a process for the heat treatment of steel, and refers more particularly to a process for improving the character and structure of steel by adding certain elements to the gases of the furnace in which the steel is treated, so that the elements in gaseous form are permeated through the steel structure.

The process is based upon the inventions of Naraina Das Chopra and Frederick John Bullen, and particularly their Patent, No. 1,712,253. The present invention is an improvement upon their methods whereby a uniform distribution of the gaseous material in the furnace is effected so that the steel under treatment will acquire positively the effect of the ingredients which improve the structure and crystalline form of the steel.

The single figure is a diagrammatic sectional view of a treating furnace in which the present process is carried out.

Referring to the drawing, the furnace consists of an insulated enclosure 1 which is heated by fuel supplied through the pipe 2, air for the combustion gases being introduced through a pipe 3. These combustion gases are discharged through a flue 4. An auxiliary chamber 5 is connected to the side of the furnace by a duct 6, and within this auxiliary chamber are positioned a plurality of blocks or bricks 7 upon a supporting shelf 8. These blocks contain the ingredients required by the heat treatment described in the Chopra and Bullen application, principally consisting of alkaline earth oxide such as lime and a substantially carbonaceous material.

These blocks or bricks may be set up in checker-work form and may be compounded or manufactured in combination with non-fusible ingredients such as refractory fire clay or the like. In this form the furnace gases passing over the bricks or blocks at high temperatures will become impregnated with the gaseous constituents produced by the action of the furnace gases on the treating materials, and the presence of the refractory material in the blocks will prevent the fusion and agglomeration of the treating constituents which renders the treating constituents relatively ineffective for combination with the furnace gases. A fan 9 driven by a motor 10 draws a portion of the furnace atmosphere through the chamber 6 through the duct 11 and discharges it through the recirculation duct 12 by means of which it is recycled and combined again with the combustion gases substantially at their introduction to the furnace.

In this way the atmosphere of the furnace is kept completely and uniformly impregnated with the treating constituents and these constituents pass into and have their effect upon the ingots 13 positioned within the treating furnace.

The process affords a method by means of which steel within a treating furnace may be uniformly subjected to the effects of the innocuous gas containing the treating ingredients of the blocks 7. Heretofore it has been common practice to rely upon a pile of the material placed in the furnace, but difficulties have been encountered due to surface fusion of the treating substance, rendering the treating materials somewhat ineffective. The positive method disclosed assures at all times a furnace atmosphere saturated uniformly with the treating constituents or ingredients, and will produce more uniform structure in the resultant steel products.

The chamber 5 may be equipped with a removable door or panel by means of which the blocks of treating material may be supplemented or replaced in case of exhaustion of the treating ingredients.

The treating temperatures for the furnace in which the steel is placed are normal treating temperatures necessary for the particular types of steel produced. The temperatures in the treating chamber will normally range below the furnace temperatures, the only requirement being that the temperature be sufficiently high in the chamber 5 to volatilize and carry off in gaseous form the treating ingredients. Normally temperatures in excess of 500° C. are sufficient. A typical example of the constituents of the treating blocks consists of a mixture consisting of one part by weight of lime and eight parts by weight of boiler ash carrying about $\frac{1}{10}$ of one per cent of combustible carbon. Another mixture which has been found feasible has two parts of lime and three parts of exhausted carburizer containing about 15% of free carbon. The treatment using this re-circulation method is applicable to heat treatment in any type of furnace whether electrically or gas fired or of the open hearth type. Also steel of any type may be treated at any time during the processing by the present method.

Also the amounts of the treating material will vary according to the necessities of the different types of steel. The analysis of the steel particularly in relation to its liability to oxidation, the weight of the steel in any furnace, the area of steel exposed to the gases in relation to the volume of gas supplied to the furnace, the design of the furnace and the actual chemical composition of the furnace gases themselves will vary in different gases and will necessitate different amounts of the treating material.

I claim as my invention:

1. A process for the heat treatment of steel which comprises the steps of impregnating a treating furnace atmosphere with a gaseous material comprising lime and a substantially non-carburizing, carbon-carrying material and recirculating a portion of the atmosphere to obtain a uniform distribution of the treating materials throughout the furnace.

2. A process for the heat treatment of steel which comprises the steps of circulating a portion of the furnace gases through a separate chamber and there impregnating them with the treating materials comprising lime and a substantially non-carburizing, carbon-carrying material, recirculating said treated gases and combining them with the incoming furnace combustion gases, and continuing the recirculation to maintain the furnace gas atmosphere with a predetermined concentration of treating materials.

3. A process for the heat treatment of steel which comprises the steps of withdrawing a portion of the combustion gases from a furnace, passing them over a treating material comprising lime and a substantially non-carburizing, carbon-carrying material at a temperature sufficiently high to drive off the treating materials in gaseous form, re-cycling the material-laden combustion gases to the furnace and combining them with the incoming gases to create a furnace atmosphere uniformly impregnated with the treating materials and diverting continuously a portion of the combustion gases from the furnace.

WALTER M. CROSS.